United States Patent

[11] 3,617,663

[72] Inventor Lawrence C. Whittemore
 19641 Waterbury Lane, Huntington Beach, Calif. 92646
[21] Appl. No. 64,992
[22] Filed Aug. 19, 1970
[45] Patented Nov. 2, 1971

[54] ANTITHEFT LOCK FOR VEHICLE BRAKES AND IGNITION SYSTEM
 5 Claims, 7 Drawing Figs.

[52] U.S. Cl. .................................................. 200/61.86,
 188/353, 251/263, 303/89
[51] Int. Cl. ........................................................ B60r 25/08,
 H01h 27/06, H01h 21/28
[50] Field of Search ............................................ 200/61.86,
 44; 303/89; 188/353; 251/251, 258, 259, 260, 261, 262, 263; 137/513

[56] References Cited
 UNITED STATES PATENTS
 2,220,620  11/1940  Capen .......................... 188/353 X
 2,338,101  1/1944  Ellinwood ..................... 251/258
 2,930,864  3/1960  Novak .......................... 200/61.86
 3,241,888  3/1966  Ternent ........................ 303/89
 3,322,246  5/1967  Noguchi ....................... 188/353 X
 3,515,442  6/1970  Whittemore ................. 303/89

Primary Examiner—Robert K. Schaefer
Assistant Examiner—Robert A. Vanderhye
Attorney—Lyon & Lyon ABSTRACT: A lock mechanism for vehicles having two pairs of hydraulic brakes, each pair separately actuated from a dual master cylinder assembly, includes a pair of check valves which act to retain fluid under pressure in the individual brake cylinders to prevent movement of the vehicle. The check valves are both opened by a key-operated cam acting through a crosshead to release the brakes when desired. The cam operates a rotary electrical switch to interrupt the starter switch circuit when the check valves are closed.

PATENTED NOV 2 1971　　　　3,617,663

INVENTOR
LAWRENCE C. WHITTEMORE
BY
Lyon & Lyon
ATTORNEYS

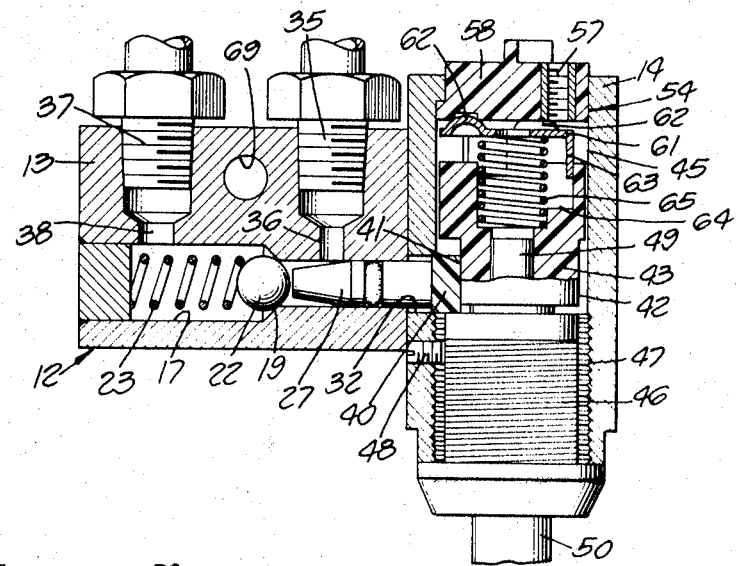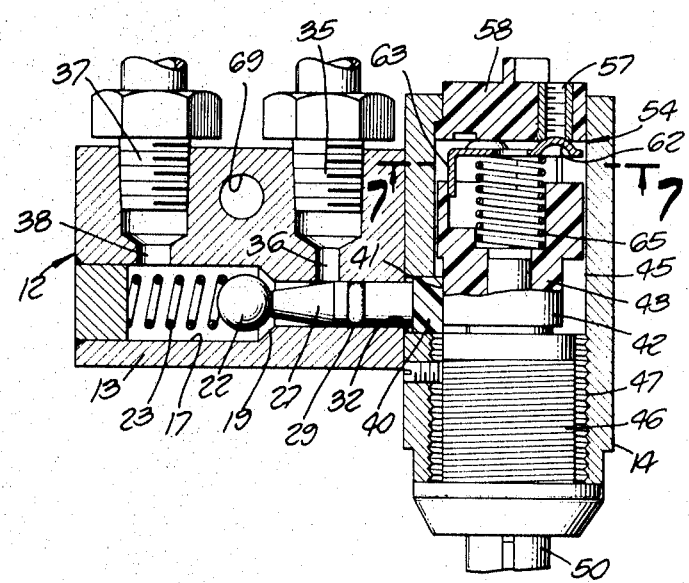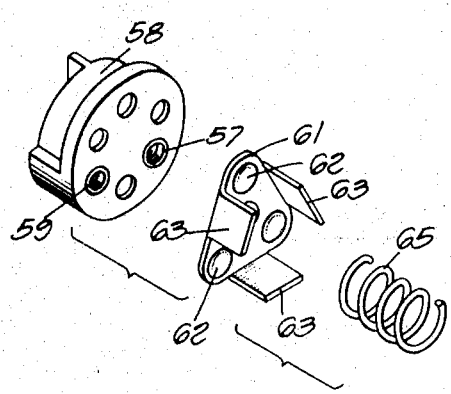

ANTITHEFT LOCK FOR VEHICLE BRAKES AND IGNITION SYSTEM

This invention relates to apparatus for locking the hydraulic brakes of a vehicle and for interrupting the starter switch circuit in order to prevent unauthorized use of the vehicle. This invention is particularly directed to vehicles having a dual master cylinder for separately operating pairs of hydraulic brakes. It is an important object of this invention to provide improved apparatus for locking the brakes on all four wheels of the vehicle and to release them only upon use of a special key.

It is another object of this invention to provide a key-operated cam for unseating check valves mounted in the hydraulic lines which extend between the master cylinder and the brakes.

A further object to provide a device of this type incorporating a rotary electrical switch for interrupting the starter switch circuit of the vehicle engine when the valve parts are in position to lock the brakes.

Other and more detailed objects and advantages will appear hereinafter.

In the drawings:

FIG. 4 is a sectional plan view taken substantially on the lines 4—4 as shown in FIG. 3, the parts being shown in locked position.

FIG. 5 is a view similar to FIG. 4, showing the parts in unlocked position.

FIG. 6 is an exploded view of the parts of the electrical switch assembly.

Figure 1:
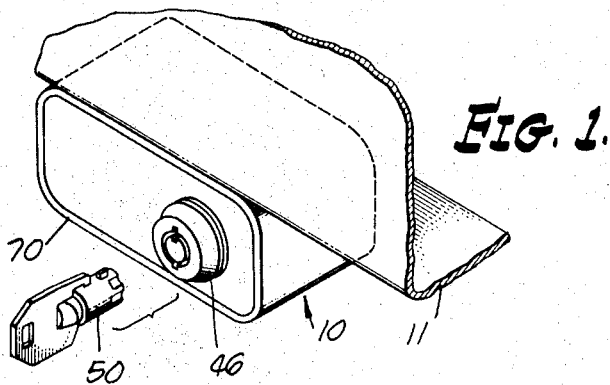
FIG. 1 is a perspective view showing a preferred embodiment of the invention.

Referring to the drawings, the locking device generally designated 10 is adapted to be mounted under the dashboard 11 of a vehicle, as shown in FIG. 1. The device includes a housing 12 which comprises a valve block 13 and a body 14 connected by threaded fasteners 15. The valve block 13 is provided with parallel passages 16 and 17 each having a valve seat 18, 19 intermediate its length. A ball check valve 20 is closed against the seat 18 by means of a coil spring 21, and the ball check valve 22 is closed against the seat 19 by the coil spring 23. A plunger 25 is slidably mounted within the bore 26 which forms a part of the passage 16 and a plunger 27 is slidably mounted within the bore 28 which forms a part of the passage 17. Each plunger is provided with a seal ring 29.

Figure 3:
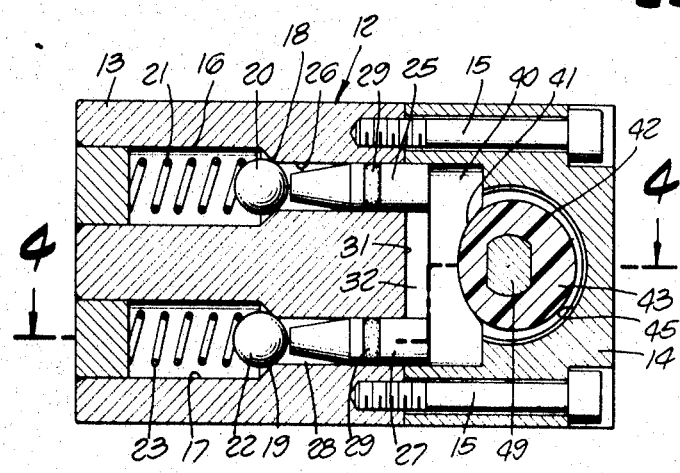
FIG. 3 is a sectional elevation taken substantially on the lines 3—3 as shown in FIG. 2.

The plungers 25 and 27 project from the face 31 of the valve block 13 and into a slot 32 formed in the external side face of the body 14. As shown in FIGS. 4 and 5, an inlet fitting 35 mounted on the valve block 13 communicates by port 36 with the passage 17 on one side of the seat 19, and the outlet fitting 37 communicates by port 38 to the passage 17 on the other side of the seat 19. Similarly, an inlet fitting 39 communicates with the passage 16 on one side of the seat 18, and the outlet fitting 40 communicates with the passage 16 on the other side of the seat 18. When the ball check valves are closed against their respective seats, as shown in FIG. 3, hydraulic fluid is prevented from passing from the inlet fittings 35 and 39 to the outlet fittings 37 and 40.

Means are provided for moving the plungers 25 and 27 axially in a direction to unseat the ball check valves 20 and 22 against the action of the coil springs 21 and 23. As shown in the drawings, this means comprises a crosshead 40 slidably mounted in the slot 32 and having opposite end portions which contact the projecting ends of the plungers 25 and 27. This crosshead 40 has a curved surface 41 engaged by the noncircular surface 42 of the cam member 43. This cam member 43 is mounted to turn within the bore 45 of the body 14. A key-operated lock assembly 46 is mounted within the threaded portion 47 of the bore 45 and held in position by means of a lock screw 48. A noncircular drive lug 49 projects into a similarly shaped socket in the cam member 43, so that turning of the lug 49 by means of the key 50 and assembly 46 serves to turn the cam member 43. This turning movement serves to move the crosshead 40 to the left, as viewed in FIGS. 3, 4 and 5, thereby moving the plungers 25 and 27 to unseat the ball check valves 20 and 22, so that hydraulic fluid may flow from the inlets 35 and 39 to the outlets 37 and 40. The inlet 35 is connected to the dual master cylinder assembly 42 at 43, and the inlet 39 is connected to the assembly 42 at 44. The outlet 37 is connected to hydraulic line 45a leading to the front wheel brake cylinders, and the outlet 40 is connected to hydraulic line 46a leading to the rear wheel brake cylinders.

Means are also provided for interrupting the electrical lead wire connecting the solenoid 51 on the engine starter 52 to the starter switch 56. This is accomplished by placing a rotary electrical switch assembly generally designated 54 between the electrical lead 50 and the electrical lead 55 extending to the starter switch 56 mounted on the vehicle dashboard 11. The electrical lead 55 is connected to the metal insert 57 in the stationary insulating plug 58 mounted in the body 14 at one end of the bore 45. The other electrical lead 50 is connected to the other metallic insert 59 in the same plug 58. A metallic switch plate 61 generally triangular in shape is provided with three equally spaced projections 62. This switch plate is provided with axially extending fingers 63 which project into recesses 64 provided in one end of the cam member 43, so that the switch plate 61 turns with the cam member. A coil spring 65 acts to move the switch plate 61 toward the plug 58. When two of the projections 62 contact the metallic inserts 57 and 59, an electrical connection is established between them. When the switch plate is turned to bring the projections 62 out of contact with the metallic inserts 57 and 59, the electrical connection is interrupted. The parts are arranged so that when the check valves are unseated by action of the cam member 43, the projections 62 on the switch plate 61 establish electrical connection between the metallic inserts 57 and 59. Hence, when the brakes are unlocked, the starter circuit is connected.

Figure 2:
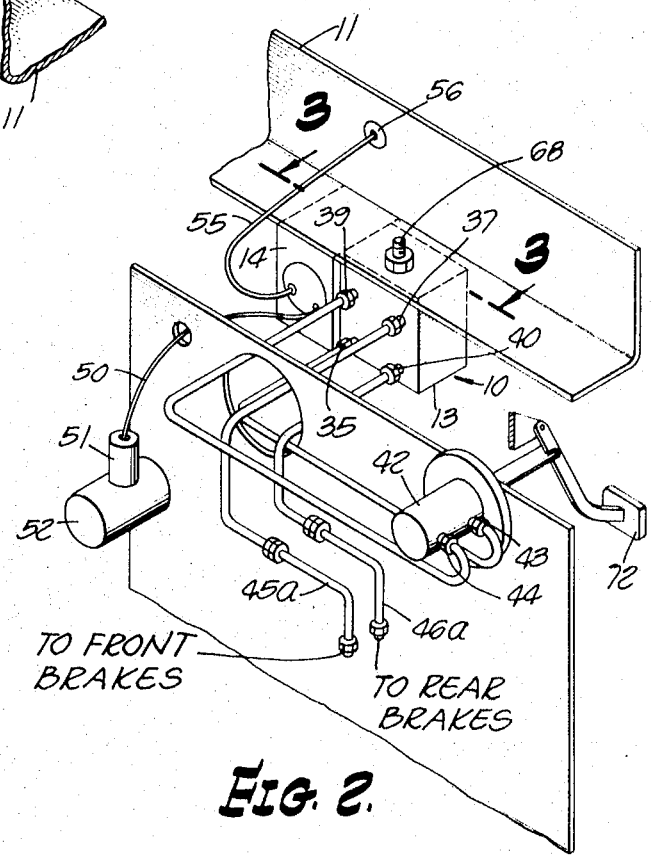
FIG. 2 is a perspective view showing the manner of external hookup of hydraulic lines and electrical lines for connecting the device of this invention to the hydraulic brake system and to the starter switch system of the vehicle.
Figure 7:
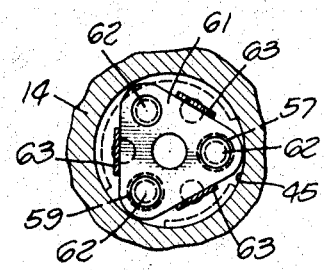
FIG. 7 is a sectional detail taken substantially on the lines 7—7 as shown in FIG. 5.

The housing 12 is conveniently attached under the dashboard by means of a threaded fastening 68 (FIG. 2) which extends through the opening 69 provided in the valve block 13. A decorative cover 70 may be provided to enclose that portion of the housing 12 which is visible from the driver's compartment of the vehicle.

In operation, the four wheel brakes of the vehicle are applied by depressing the brake pedal 72 (FIG. 2), thereby causing the dual master cylinder 42 to pressurize the hydraulic lines 45a and 46a leading to the vehicle brakes. While the brake pedal 72 is still depressed and the brake lines pressurized, the key 50 is turned in the part 46 to bring the parts from the position shown in FIG. 5 to the position shown in FIG. 4. The brake pedal 72 may then be released. The brake lines 45a and 46a remain pressurized because the ball check valves 20 and 22 prevent return flow of hydraulic fluid to the dual master cylinder 42. Moreover, the switch plate 61 is in the position in which the metallic inserts 57 and 59 are electrically disconnected. The starter switch 56 is inoperative, and the vehicle brakes remain locked. When it is desired to move the vehicle, the key 50 is reinserted into the part 46 and turned to bring the parts to the position shown in FIG. 5. This action unseats the ball check valves 22 to permit hydraulic flow from the brake lines 45a and 46a back to the dual master cylinder 42, and the switch plate 61 reestablishes electrical communication from the starter switch 56 to the starter solenoid 51.

Having fully described my invention, it is to be understood that I am not to be limited to the details herein set forth but that my invention is of the full scope of the appended claims.

I claim:

1. In a locking device for a vehicle having two pairs of hydraulic brakes, each pair separately actuated from a dual master cylinder assembly, the improvement comprising, in combination: a housing having two passages each provided with a valve seat, means on the housing providing an inlet and an outlet for each passage, respectively, on opposite sides of each valve seat, a check valve member in each passage, resilient means acting to close each check valve member against its respective valve seat, a plunger slidably mounted in each passage to move each check valve member respectively away from its valve seat against the action of the resilient means, a crosshead within the housing contacting each plunger, a key-operated cam member mounted to turn within the housing and engaging the crosshead, and means whereby said inlets may be connected to the dual master cylinder assembly and the outlets connected to each pair of hydraulic brakes, whereby turning of the key-actuated cam member causes the plungers to displace the check valve members from their respective seats.

2. The combination set forth in claim 1 in which the housing comprises a valve block and a body secured together, said passages, valve seats, inlets and outlets being mounted in the valve block and said cam member being mounted in the body, and the body having an external slot adjacent the valve block for sliding reception of said crosshead.

3. The combination set forth in claim 1 in which said resilient means comprises a coil compression spring acting against each check valve member, and wherein each check valve member comprises a ball.

4. In a locking device for a vehicle having two pairs of hydraulic brakes, each pair separately actuated from a dual master cylinder assembly, the improvement comprising, in combination: a housing comprising a valve block and a body secured together by fasteners, the valve block having two passages each provided with a valve seat, means on the valve block providing an inlet and an outlet for each passage, respectively, on opposite sides of each valve seat, a check valve member in each passage, a spring acting to close each check valve member against its respective valve seat, a plunger slidably mounted in each passage to move each valve member respectively away from its valve seat against the action of its spring, a crosshead slidably mounted on the body contacting each plunger, the body having a bore, a key-operated cam member mounted to turn within the bore and engaging the crosshead, and means whereby said inlets may be connected to the dual master cylinder assembly and the outlets connected to each pair of hydraulic brakes, whereby turning of the key-actuated cam member causes the plungers to displace the valve members from their respective seats.

5. In a locking device for a vehicle having two pairs of hydraulic brakes, each pair separately actuated from a dual master cylinder assembly, the vehicle also having a prime mover with an electrical starter, the improvement comprising, in combination: a housing having two passages each provided with a valve seat, means on the housing providing an inlet and an outlet for each passage, respectively, on opposite sides of each valve seat, a spring-urged check valve member in each passage adapted to close against its respective valve seat, a plunger slidably mounted in each passage to move each check valve member respectively away from its valve seat against the spring action, a crosshead within the housing contacting each plunger, a key-operated cam member mounted to turn within the housing and engaging the crosshead, a rotary electrical switch within the housing driven by the cam member, means for connecting said switch to the electrical starter, and means whereby said inlets may be connected to the dual master cylinder assembly and the outlets connected to the hydraulic brakes, whereby turning of the key-actuated cam member causes the plungers to displace the check valve members from their respective seats and to close the electrical switch.

* * * * *